June 18, 1940.  J. W. ALLEN  2,205,330
SYNCHROSCOPE
Filed Jan. 14, 1935
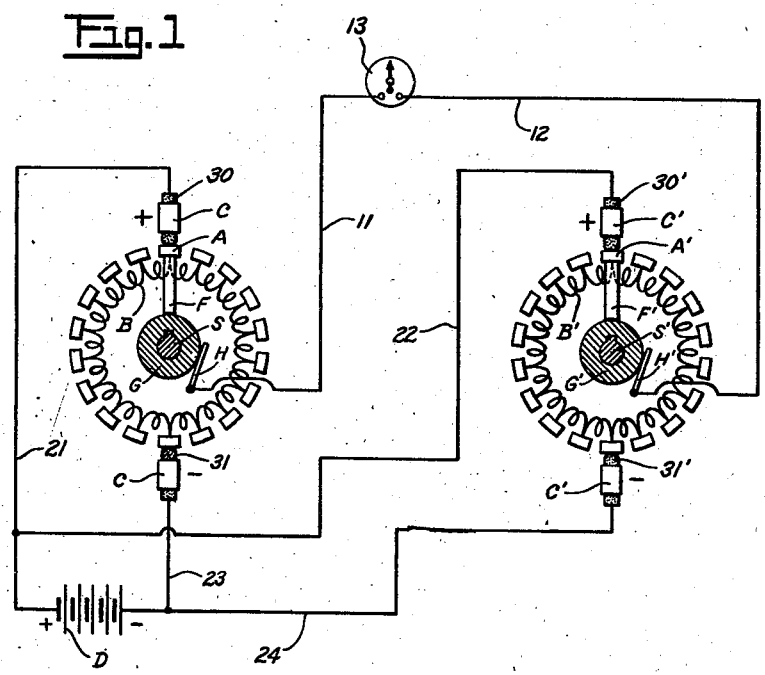
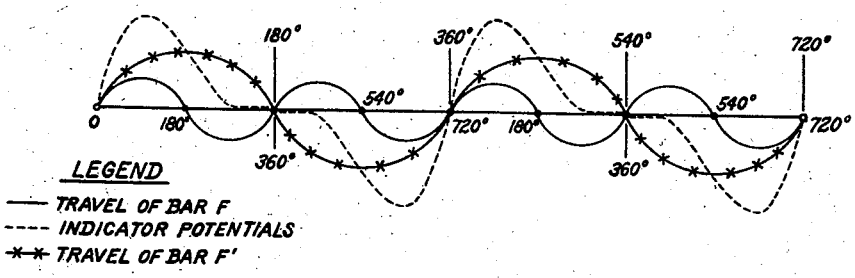
LEGEND
— TRAVEL OF BAR F
---- INDICATOR POTENTIALS
✶✶ TRAVEL OF BAR F'
INVENTOR.
Joseph W. Allen
BY
ATTORNEY.

Patented June 18, 1940

2,205,330

UNITED STATES PATENT OFFICE 2,205,330

SYNCHROSCOPE

Joseph W. Allen, East Orange, N. J., assignor to Eclipse Aviation Corporation, East Orange, N. J., a corporation of New Jersey Application January 14, 1935, Serial No. 1,817

3 Claims. (Cl. 177—311)

This invention relates to indicating apparatus and particularly to means for indicating the relationship between the rates of movement of any two or more continuously moving mechanisms such as internal combustion engines installed on an airplane or other craft and subject to variations in speed.

An object of the invention is to provide an indicating system including a synchroscope and means for causing said synchroscope to assume a definite position or condition when the subjects of study, such as the internal combusion engines above suggested, are operating in synchronism, and to display a different type of indication when said engines are rotating at different speeds.

This and other objects and advantages will appear more fully from a consideration of the detailed description which follows, with reference to the accompanying drawing, wherein is illustrated one embodiment of the invention. It is to be expressly understood, however, that the drawing is for the purpose of illustration only, and is not designed as a definition of the limits of the invention, reference being had for this purpose to the appended claims.

In the drawing:

Fig. 1 is a combined mechanical and schematic representation of the invention as applied to two independently rotating bodies S and S';

Fig. 2 is a graph showing voltage changes during operation.

Reference characters S and S' indicate rotating shafts such as the crank-shafts of two distinct internal combustion engines, or shafts geared thereto. On the shaft S there is keyed a ring G of current conducting material which will be termed a collector ring since its function is similar to that of the conventional collector ring employed in alternating current machines and the reference character G' indicates a corresponding collector ring similarly secured to the shaft S'. As shown, the rings have brushes H and H' associated therewith and electrically connected through the instrumentality of conductors 11 and 12 and a voltmeter 13 which in the form of the invention illustrated constitutes the means on which the speed relationship between the two shafts S and S' is indicated. This meter 13 may be of the ordinary polarized galvanometer type, as in British Patent No. 191,849 of 1923.

Also engaging the collector rings G and G' respectively, are a pair of current conducting bars F and F' adapted to rotate with commutator bars A and A' respectively, to which they are secured, the said bars A and A' being part commutator assemblies having a plurality of similar current conducting segments spaced apart but electrically connected through the looped windings B and B' respectively. At diametrically opposed stationary locations brush holders C are provided and each contains a brush 30, 31 adapted to be engaged by each of the commutator segments in succession as the latter rotate with the shaft S, collector ring G, and connecting bar F, the commutator assembly being mechanically connected with the shaft S in any suitable manner not shown. Corresponding fixed brush holders C' retain brushes 30', 31' which cooperate in a similar manner with the segments A' of the commutator assembly which rotates with the shaft S', and the brushes are electrically connected in parallel relation by means of conductors 21, 22, 23, and 24, all leading from a battery D or other source of direct current.

From the foregoing description it will be apparent that the conductor B forms a path for the flow of current from the battery D through conductor 21 to the positive brush 30 and thence through the looped winding B to the negative brush 31 and back to the source by way of conductor 23 while a similar flow of current will take place by way of conductor 22, positive brush 30', winding B', negative brush 31', then conductor 24. Moreover, as the commutators are rotated each collector ring and its associated stationary brush will be successively positive and negative and since the said brushes are interconnected through the indicator 13 it will be apparent that the indicator, which as above suggested is in reality a voltmeter, will give a zero indication so long as the speed of rotation of the two commutator assemblies A and A' remain identical, for under such conditions the brushes H and H' remain at equal values of potentials and therefore no current flows through voltmeter 13. In further explanation of this action it will be noted that in the relative positions shown in the drawing both collector rings G and G' are at positive potential and also at equal values of potential. If both commutators are rotated at same rate, the collector rings will always be at the same potential, hence no deflection of the indicator. If from the positions as shown, the right hand commutator is turned 180°, the collector ring of the right hand will be negative potential. Since now the one side of the indicator is connected to the left side and positive while the other side of indicator is connected to the negative, a maximum deflection to one side occurs.

If both commutators are now rotated 180° each, the collector ring on the left side would be at negative potential while the collector ring at right would be at positive potential. This would provide a maximum deflection to the opposite side of the indicator.

If both commutators are turning at engine speed of say 1800 R. P. M. and both connectors F and F' are as shown (that is, "in phase"), there is always a zero potential difference between the 2 collector rings. If bar F is 180° out of phase with respect to bar F', the potential impressed on the indicator is a maximum twice each revolution (that is, when left ring is at top and right ring at bottom; also when left ring is at bottom and right ring is at top). The potentials on the indicator would also be zero twice per revolution. Fig. 2 explains this cyclic action graphically.

The indicator, when the bars F, F' are not in exact phase relation, would therefore be subjected to an alternating potential whose magnitude will depend on the actual phase relation.

In effect, the coils B and B', and the elements F, G, H, 11, 12, 13, H', G' and F' constitute a Wheatstone bridge, with each coil divided into segments of continuously varying length as the connectors F and F', due to their continuous rotation, operate to alternately move toward and away from the bridge terminals 30, 31, 30' and 31'. Due to this action the direction and magnitude of E. M. F. through conductors F, H, 11, 12, H' and F' change periodically, except when synchronism prevails. During synchronism the bridge ratio remains constant—hence no E. M. F. in conductors 11, 12 and no action in indicator 13.

An incandescent lamp may be used as an indicator. If it stays dark (or at a uniform brilliancy), the 2 units are in synchronism. When the light is dark and bright alternately, the number of such alternations is a measure of the difference in revolutions of the 2 units.

A thermo-electric, or well damped, indicating instrument for D. C. and A. C. could be used instead of a lamp and the amount of deflection could be used as a measure or indication of actual phase difference of the units.

Likewise other changes may be made in the type of indicator employed as well as in the arrangement of the electrical connections and parts entering into the system within the scope of appended claims.

What is claimed is:

1. In an indicating system, the combination of a pair of continuously rotating commutators, each having a plurality of current conducting segments, a coiled conductor rotatable with each commutator and tapped into each of said segments, means including fixed brushes engageable with said segments to send equally divided parallel currents through equilinear sections of both said coiled conductors, a collector ring electrically connected with a predetermined segment on each of said commutators, additional fixed brushes engaging said collector rings, means constantly in circuit with said last named brushes to indicate whether said commutators are rotating in or out of synchronism, and a single external source of current in circuit with both said commutators, and constituting the only current supply means for the system.

2. In an indicating system, the combination of a pair of continuously rotating commutators, each having a plurality of current conducting segments, a coiled conductor rotatable with each commutator and tapped into each of said segments, means including fixed brushes engageable with said segments to send equally divided parallel currents through equilinear sections of both said coiled conductors, a collector ring electrically connected with a predetermined segment on each of said commutators, means constantly in circuit with said collector rings to indicate whether said commutators are rotating in or out of synchronism, and a single external source of current in circuit with both said commutators, and constituting the only current supply means for the system.

3. Means for indicating whether two continuously rotating bodies are or are not in synchronism, said means comprising coiled conductors rotatable with said bodies, a source of current, a circuit from said source to said coiled conductors, said circuit including means dividing said coiled conductors into parallel paths for reception of current from said current source, and means electrically connected with said dividing means to respond to the resistance relationship between said parallel paths.

JOSEPH W. ALLEN.